Feb. 14, 1950 — R. E. HERRSTRUM ET AL — 2,497,608
HYDRAULIC CIRCUITS FOR MACHINE TOOLS
Filed May 15, 1947 — 6 Sheets-Sheet 3

Inventors:
Rudolph E. Herrstrum
Stanley A. Bjorklund
By: Critlaw, Schroeder, Merriam & Hofman
their Attorneys.

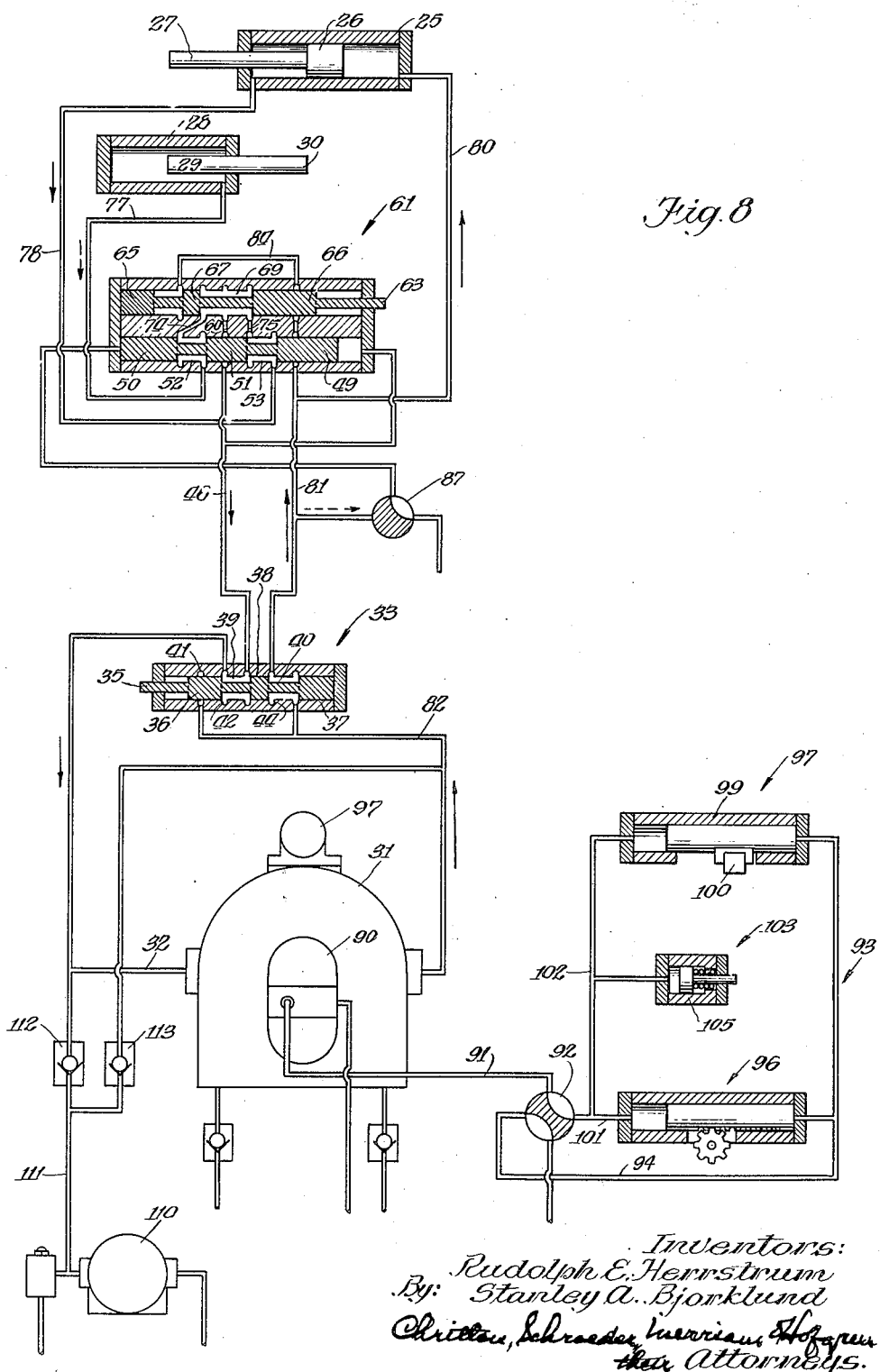

Feb. 14, 1950   R. E. HERRSTRUM ET AL   2,497,608
HYDRAULIC CIRCUITS FOR MACHINE TOOLS

Filed May 15, 1947                                             6 Sheets-Sheet 6

Inventors:
Rudolph E. Herrstrum
Stanley A. Bjorklund
By Christon, Schraeder, Merriam & Hofgren
their Attorneys.

Patented Feb. 14, 1950

2,497,608

UNITED STATES PATENT OFFICE 2,497,608

HYDRAULIC CIRCUITS FOR MACHINE TOOLS

Rudolph E. Herrstrum and Stanley A. Bjorklund, Rockford, Ill., assignors to Rockford Machine Tool Company, Rockford, Ill., a corporation of Illinois Application May 15, 1947, Serial No. 748,254

11 Claims. (Cl. 60—52)

This invention relates to hydraulic circuits, and more particularly to a hydraulic circuit for a hydraulic machine tool.

It is a general object of this invention to provide a hydraulic circuit for machine tools of the shaper or planer class of improved construction and arrangement.

It is a further object of the invention to provide in a machine tool of the class described, a hydraulic circuit including two pistons for the reciprocation of the table or platen.

Another object of the invention is to provide a hydraulic circuit embodying a single acting and a double acting piston to reciprocate the table or platen.

Yet another object of the invention is to provide a two cylinder hydraulic motor adapted to be used in conjunction with a positive displacement variable volume pump for reciprocating the table.

Another object of the invention is to provide in a hydraulic machine tool of the class described, a two piston motor arrangement for reciprocating the table having at least three forward cutting speeds.

A further object of the invention is to provide for a rapid return stroke of the reciprocating table regardless of the speed of the cutting stroke.

Another object of the invention is to provide for three cutting speeds and three return stroke speeds in a hydraulic circuit of the class described.

Figure 1:
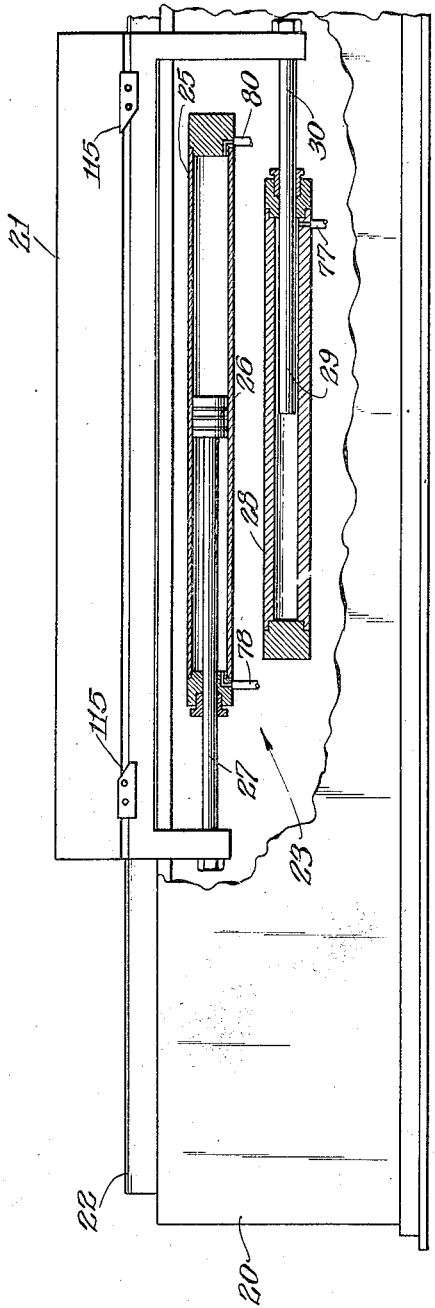

Other and further objects of the invention will become apparent of the following description and drawings in which Fig. 1 is a view partly broken away for clarity of illustration, of a planer table; and, Figs. 2 to 11, inclusive, are diagrammatic views of the hydraulic motor and hydraulic circuit for reciprocating the table.

While our invention is susceptible of embodiment in many different forms, we have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Hydraulic machine tools of the shaper or planer class commonly employ a hydraulic circuit to direct operating hydraulic fluid to one or more piston and cylinder devices to reciprocate the table or cutting member. The invention hereinafter described is adapted for use with the type of machine tool mentioned and embodies a novel hydraulic circuit for supplying operating hydraulic fluid to two piston and cylinder devices. The first such device comprises a cylinder having a double acting piston reciprocable therein, the second cylinder having a single acting piston reciprocable therein. In the preferred embodiment, the single acting piston has a diameter equal to the diameter of the piston rod of the double acting piston so that the volume of hydraulic fluid displaced by the single acting piston and the rod end of the double acting piston is precisely equal to the volume displaced by the other end of the double acting piston. Valve means are provided to direct operating fluid to both or either of the cylinders to present three different areas to operating hydraulic fluid circulated by a variable volume reversible pump, and thereby giving three cutting speeds as well as three cutting force areas for each setting of the pump volume. If the volume of the pump is varied, an infinite number of speeds can be had within each cutting force range. Valve means are also provided so that a high return speed can be had at all times. This feature is particularly desirable in a planer because, the return of the table being a non-cutting stroke, the non-productive time is reduced to a minimum. Other advantages over conventional double acting pistons are that the device is less costly and a much better piping arrangement can be made from both the appearance and cost viewpoint, and inasmuch as hydraulic fluid is directed to the rod end of the double acting piston on the cutting stroke, the heavy load places the piston rod in tension and thereby eliminates rod deflection such as would be received when a long rod is in compression.

While the invention is susceptible of many embodiments, it will be described herein as embodied in a planer which comprises a base 20 upon which is mounted a reciprocating platen or table 21 adapted to be reciprocated upon ways 22 by means of a two cylinder hydraulic motor 23.

Figure 2:
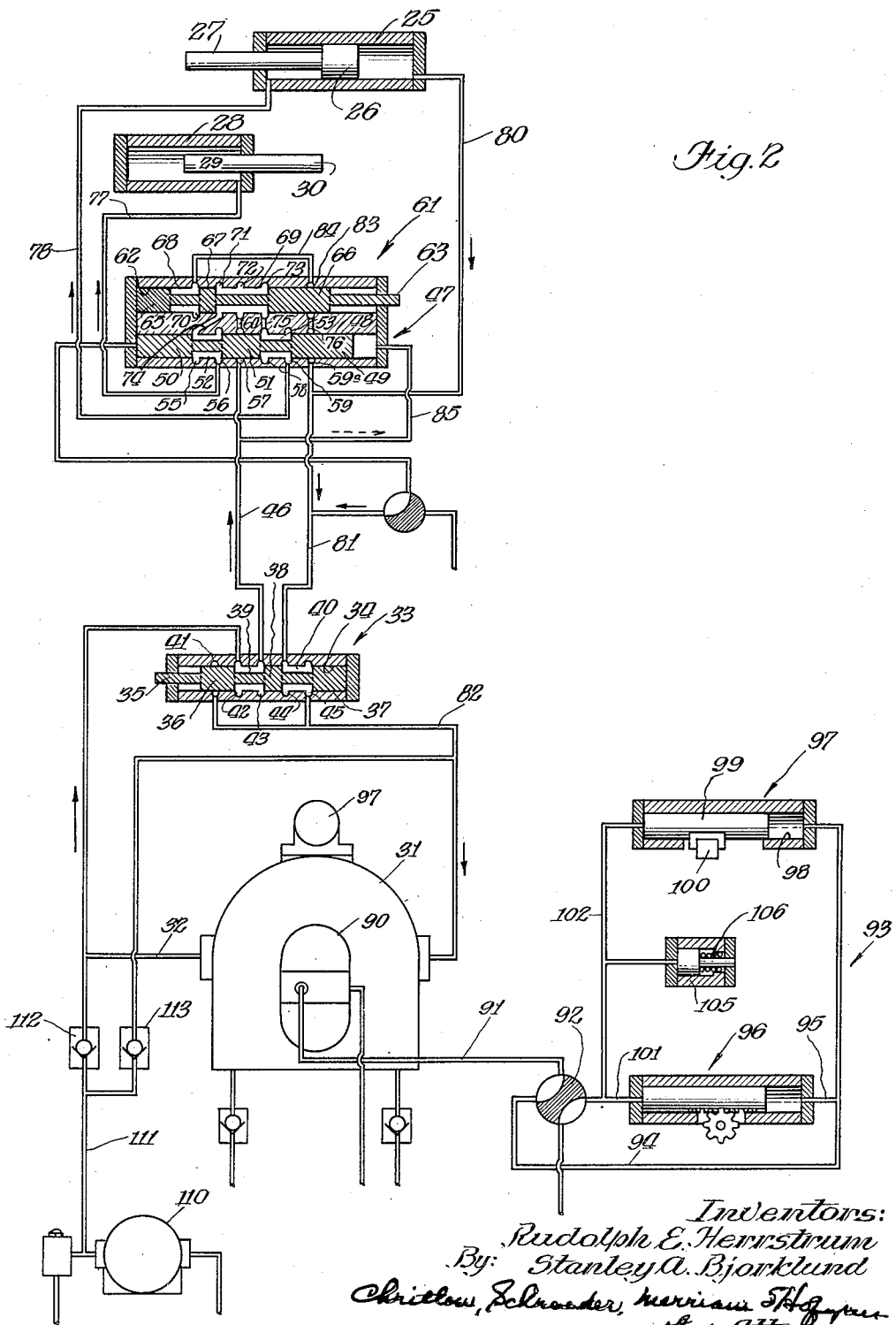

Referring now to Fig. 2, 25 indicates a cylinder having a piston 26 reciprocable therein. Attached to the piston is a connecting rod 27 extending through the left hand end of the cylinder 25, as viewed in Fig. 2. A second cylinder 28 is provided with a single acting piston 29 to which the connecting rod 30 is connected. Both connecting rods 27 and 30 are attached to the reciprocating table 21 of the planer. Hydraulic fluid under pressure is supplied to the cylinders 25 and 28 through a hydraulic circuit, which will be hereinafter more fully explained from a reversible pump 31.

The hydraulic circuit can best be described by referring to the figures which show the circuit and the various methods of operating the circuit. In the drawings, long arrows are used to designate fluid under pressure, short arrows to denote return fluid and dotted arrows to indicate static pressure. On the low speed cutting stroke, illustrated in Fig. 2, hydraulic fluid under pressure is delivered by the pump 31 to a conduit 32, which connects to a stop and start valve 33.

The valve 33 is provided with a bore 34 having a valve slidable therein. The valve has an extension 35 extending from the bore to provide a manually adjustable lever for shifting the valve to its various positions. The valve has two end portions 36 and 37 and a single intermediate land 38 providing two reduced portions 39 and 40 between the land 38 and the end portions. The valve body is further provided with annular grooves 41, 42, 43, 44 and 45.

As can be seen, hydraulic fluid under pressure is delivered from the conduit 32 to the annular groove 42, reduced portion 39 to the annular groove 43 and thence into a conduit 46 to a high return valve 47.

The high return valve 47 comprises a bore 48 having a valve slidable therein, the valve being provided with two end portions 49 and 50 and an intermediate land 51. Two reduced portions 52 and 53 are provided between the central land and the end portions. The valve body is further provided with annular grooves 55, 56, 57, 58 and 59 and 59a.

Fluid under pressure from the conduit 46 is delivered to the annular groove 57 and thence to a passage 60 connecting with the speed selector valve 61. The selector valve comprises a bore 62 having a valve slidable therein, the valve being provided with a portion 63 extending beyond the valve body to provide means for moving the valve to various speed positions which will be hereinafter described. The speed selector valve 61 has two end portions 65 and 66 and a single land 67. Two reduced portions 68 and 69 are defined between the land and the end portions. The speed selector valve is also provided with the annular grooves 70, 71, 72, 73 and 83, the annular groove 71 being connected with the annular groove 55 of the high return valve by means of a passage 74, the annular groove 72 connecting with the annular groove 57 by passage 60, as previously described, and the annular groove 73 connects with the annular groove 58 by passage 75. The annular groove 59a connects with annular groove 83 by means of passage 76.

The fluid under pressure delivered to the passage 60 is conducted into reduced portion 69 of the speed selector valve 61 by the annular groove 72 and thence passes via passage 74, annular groove 55 to a conduit 77 connecting with the cylinder 28 which contains the single acting piston 29. Hydraulic fluid under pressure is also conducted from the reduced portion 69 via passage 75, annular groove 58, reduced portion 53, and annular groove 59 to a conduit 78 which conducts the hydraulic fluid to the left hand or rod end of the cylinder 25 containing the double acting piston 26.

The hydraulic circuit, just described with the various valves in the positions shown in Fig. 2, produces a low speed cutting stroke. It can be seen that hydraulic fluid under pressure is directed to the rod end of the cylinder 25, and hence upon cutting stroke, the connecting rod 27 is under tension. This is in contrast to other forms of piston and cylinder devices which generally provide for a cutting stroke with the connecting rod under compression. The areas presented by the pistons to the fluid pressure are preferably so arranged that two thirds of the force delivered to the table is derived from the double acting piston and one third from the single acting piston. Fluid from the right hand end of the double acting cylinder 25 passes by means of a conduit 80 to conduit 81 and annular groove 44 of the stop and go valve, reduced portion 40, annular groove 45 and a conduit 82 and back to the intake side of the pump 31. The diameter of the piston 29 is exactly equal to the diameter of the connecting rod 27 so that the difference between the areas of the two sides of the piston 26 in the double acting cylinder is exactly equal to the area of the piston 29. Therefore, the right hand or piston end of the cylinder 25 delivers precisely the same volume of oil to the intake side of the pump, as is delivered by the discharge side of the pump to the left hand or rod end of that cylinder and to the single acting cylinder 28.

Figure 3:
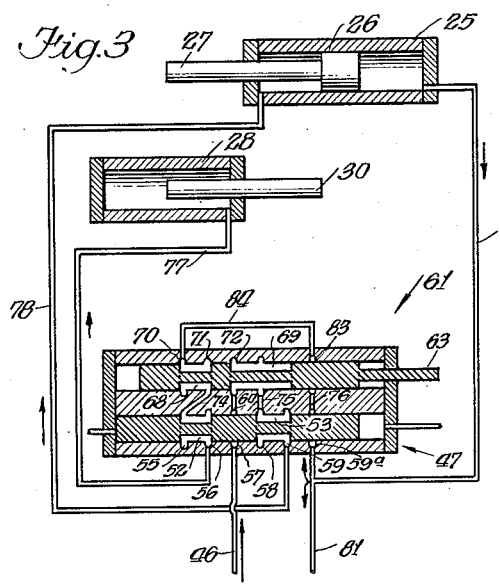

Shifting the speed selector valve 61 to the position shown in Fig. 3, provides for a medium cut. With the valve in the position shown in that figure, fluid under pressure is directed from the conduit 46 to the annular groove 57, passage 60, annular groove 72 to the reduced portion 69. Fluid under pressure from the reduced portion 69 is thence directed via passage 75, annular groove 58, reduced portion 53, annular groove 59 to conduit 78 and thence to the left hand or rod end of the cylinder 25. Fluid from the right hand end of the cylinder 25 is returned via conduits 80 and 81 to the pump. As fluid pressure from the discharge side of the pump is being delivered only to the rod end of the cylinder 25, more fluid is being returned from the piston end of that cylinder than is being discharged by the pump. The excess fluid is delivered to the single acting piston 28 by means of annular groove 59a, passage 76, annular groove 83, conduit 84 to annular groove 70 and thence via reduced portion 68, annular groove 71, passage 74, annular groove 55, reduced portion 52, annular groove 56 to the conduit 77 and thence to the cylinder 28. It is apparent, therefore, that precisely the same volume of oil is being returned to the intake side of the pump, as is discharged from the discharge side.

Figure 4:
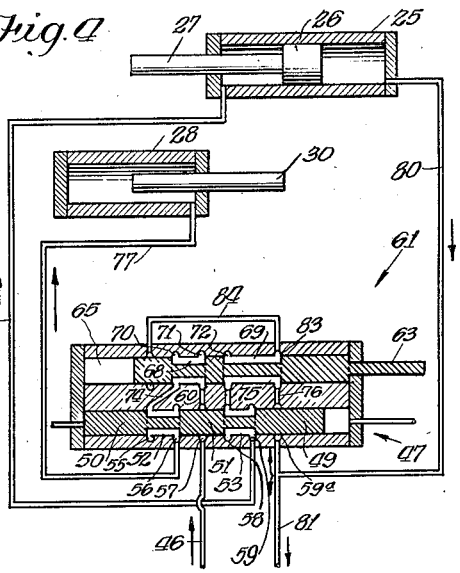

By shifting the speed selector valve 61 further to the right to the position shown in Fig. 4, a high cutting stroke is achieved in which fluid is delivered to the single acting piston only. From an inspection of that figure, it can be seen that fluid under pressure in the conduit 46 passes via annular groove 57, passage 60, annular groove 71 to the reduced portion 68, and thence through annular groove 70, passage 74 to annular groove 55. The fluid then travels via the reduced portion 52, annular groove 56, conduit 77 and into the cylinder 28. Fluid from the right hand end of the cylinder 25 is in part returned to the pump and in part conducted to the left hand end of that cylinder. This latter circuit can be traced through conduit 80, passage 76, annular groove 83, reduced portion 69, annular groove 72, passage 75, annular groove 58, reduced portion 53, annular groove 59 and conduit 78 to the rod end of the cylinder 25. Again it is clear that the pump is discharging and receiving identical volumes of oil.

With the particular hydraulic circuit which we are disclosing herein, it is possible to achieve a high speed return of the cutting member regardless of the speed of the cutting stroke. It is further possible to achieve return strokes of varying speeds, if desired.

Figure 5:
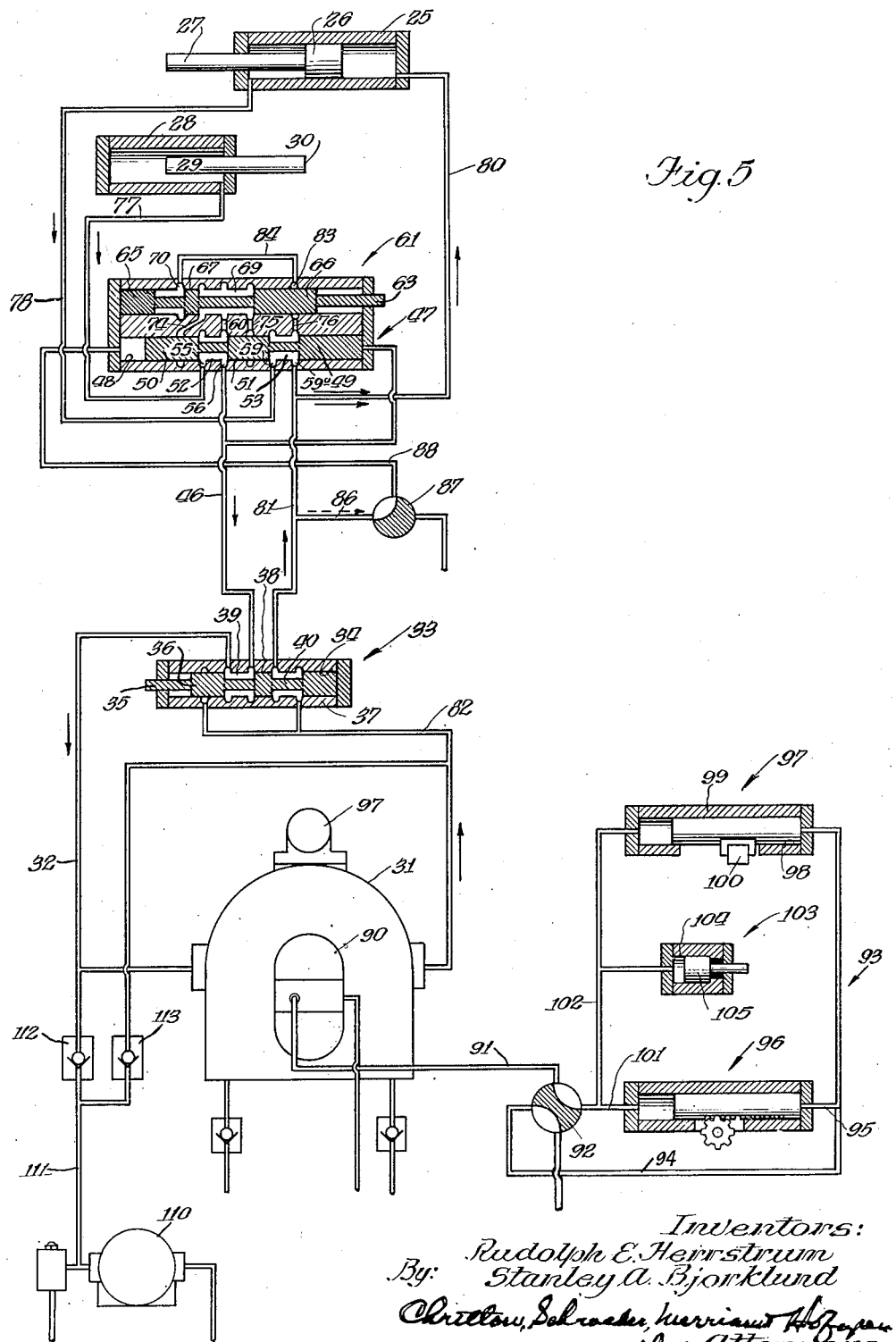
Figure 9:
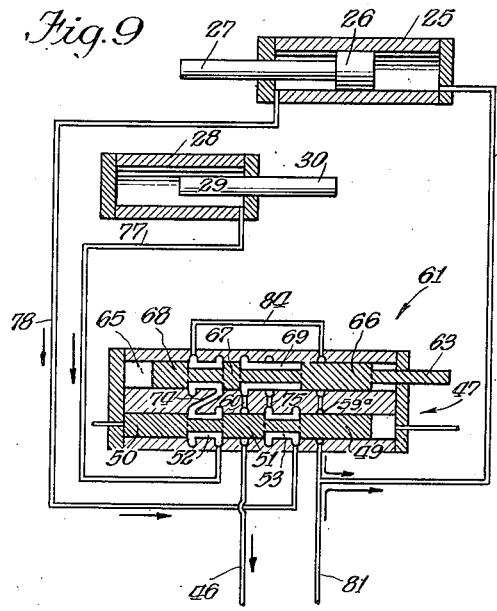

If a high speed return stroke is desired, regardless of the speed of the cutting stroke, the high return valve 47 is permitted to remain in the circuit. Referring now to Fig. 5, the speed selector valve is in the position for a low speed cutting stroke. Upon reversal of the direction of the pump 31 (which reversal of direction will be hereinafter more fully described), fluid under pressure in the conduit 81 is directed to a conduit 86, through a pilot valve 87 and by means of a conduit 88 to the left hand end of the bore 48 thereby shifting the high return valve to the position shown. At the same time hydraulic fluid under pressure is directed into the conduit 82 through the stop and go valve 33 and into the conduit 81. The fluid under pressure is thence delivered to the right hand end of the cylinder 25 by means of the conduit 80. Fluid under pressure is also directed into the left hand or rod end of the cylinder 25 by means of the annular groove 59a, reduced portion 53, annular groove 59 to the conduit 78. Inasmuch as fluid pressure is applied to both ends of the cylinder 25, the table moves at a high return speed. As the head end of the piston presents a greater area to the fluid pressure than does the rod end, the piston will move to the left. Fluid discharged from the rod end of cylinder 25 thereby is added to the fluid discharged by the pump to effect a rapid stroke. Likewise the amount of oil discharged by the pump to effect a return stroke is equal to the volume displaced by the connecting rod 27. As previously explained, the rod 27 has the same area as the piston 29 in the single acting cylinder, and the fluid contained in that cylinder is returned to the pump to equalize the volume pumped with the volume received by the pump. As is clearly seen in Fig. 5, this return of oil from the cylinder 28 is effected through conduit 77, annular groove 55, reduced portion 52, annular groove 56 and conduit 46.

Figure 6:
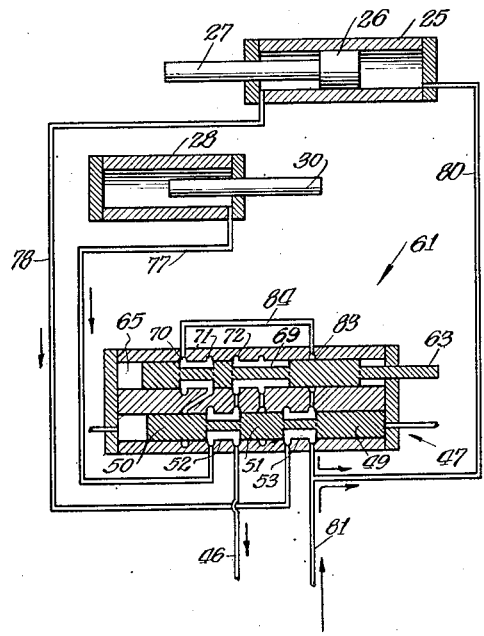
Figure 7:
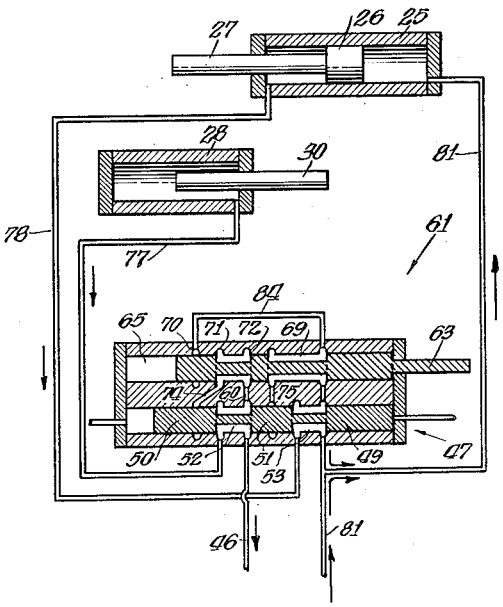

A high return speed is also achievable with the speed selector valve set for either the medium or high cut. This feature is illustrated in Figs. 6 and 7. It will be noted that with the speed selector valve in either of the positions mentioned, the high speed return is achieved in a manner similar to the one previously described with the speed selector valve in low cut position.

If it is desired that the return stroke be at the same speed as the cutting stroke, the high return valve may be cut out of the hydraulic system by the pilot valve 87. Moving the pilot valve 87 to the position shown in Fig. 8 will maintain the high return valve in a position at the left hand end of its bore 48. With the speed selector valve in the low cut position shown in that figure, upon reversal of the pump, fluid under pressure is directed to the right hand end of the double acting cylinder. Fluid from the left hand of that cylinder and from the single acting cylinder is returned to the pump. With the speed selector valve in the position shown in Fig. 9, a medium return speed is achieved by directing fluid under pressure to the single acting cylinder and to the right hand or piston end of the double acting cylinder. The fluid pumped will have a volume equal to the difference in volume of the cylinder and the piston 29, which volume, of course, equals the volume discharged from the left hand end of the double acting cylinder and a medium return is thereby obtained.

Figure 10:
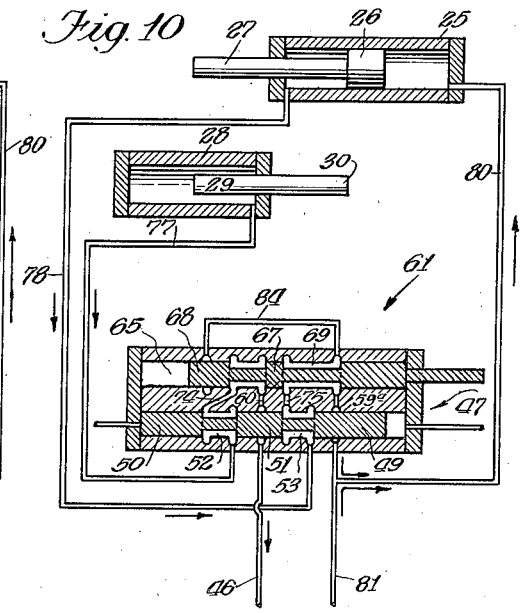
Figure 11:
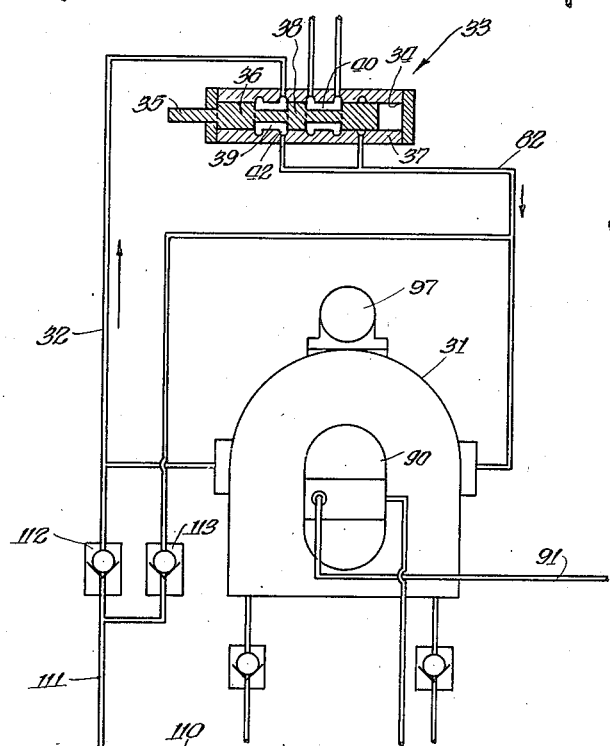

Upon shifting the speed selector valve to the position for high cut, a high speed return is obtained, as is shown in Fig. 10, wherein fluid pressure on return is directed to both ends of the double acting cylinder, while the fluid in the single acting cylinder is returned to the pump.

The reciprocation of the cutting member may be halted by the stop and go valve 33. Moving that valve to the position shown in Fig. 11, directs hydraulic fluid under pressure from the discharge conduit 32 to the annular groove 42 and thence into the return conduit 82 to the intake side of the pump.

As previously started, the pump 31 is a reversing pump. A pilot pump 90 directs pilot fluid into a conduit 91 through pilot valve 92 into the auxiliary circuit, generally designated 93. With the pilot valve in the position shown in Fig. 2, fluid passes through the valve into a conduit 94 and thence by means of a conduit 95 into a feed piston and cylinder device 96. This device is to impart an intermittent feed motion to the table or work piece in timed relationship to the reciprocation of the cutting member. Hydraulic fluid is also directed to the right hand end of the reversing cylinder 97 which in normal installation would be positioned on the pump 31 as indicated. This cylinder has a bore 98 and a piston 99 reciprocable therein. The piston is provided with reversing means 100 to reverse the direction of flow of the main pump 31.

The reciprocating member of the machine is provided with dogs 115 to trip the pilot valve 92 at the end of the stroke of the reciprocating member. Tripping the pilot valve to the position shown in Fig. 5, directs hydraulic fluid from the pilot pump 90 into a conduit 101 to the left hand end of the feed cylinder 96. Fluid is also directed into the conduit 102 and into the left hand end of the reversing cylinder 97 to shift the piston and hence the reversing device 100 to a position reversing the direction of operation of the main pump. Pilot pressure in the auxiliary circuit 93 is also directed into a piston and cylinder device, generally designated 103 for actuating a tool lifting device, if desired. This device comprises a bore 104 having a piston 105 reciprocable therein, the piston being reciprocated to the right upon pilot fluid pressure being admitted to the conduit 102 and returned to the position shown in Fig. 2 by a spring 106 upon reversal of the direction of the flow of the pilot fluid.

During the cutting operations, it sometimes becomes necessary when extremely high pressures are used, that the return line be charged to compensate for the compressibility or elasticity of the hydraulic fluid. In other words, when high pump pressure is directed to the cutting force side of the cylinders, and resistance is put to the reciprocating members, the hydraulic fluid will compress slightly with the result that when the tool leaves the work, the table will have a tendency to jump. We have eliminated this tendency by adding a resistance pressure in the return oil line. This is accomplished by providing a small supercharge pump 110 which derives oil from the tank and directs it to a conduit 111 to either the return or discharge side of the pump. This delivery to either side of the pump is through the spring check valves 112 and 113, and is permitted by those valves only upon cavitation of the oil on either the cutting or return stroke, whether such cavitation is due to compression or possible leakage.

We claim:

1. In a hydraulic machine tool having a reciprocating table, means for reciprocating the table including a closed hydraulic circuit, a pump for circulating hydraulic fluid under pressure in said circuit, a first cylinder in said circuit having a double acting piston reciprocable therein, a single piston rod in said cylinder and connected to the piston, a second cylinder in said circuit having a single acting piston reciprocable therein, said last mentioned piston having the same diameter as the piston rod and reciprocation of the pistons being adapted to cause reciprocation of the table, a valve in said circuit for selectively directing hydraulic fluid under pressure to either or both of said cylinders to cause the said pistons to reciprocate therein and means for directing return fluid from said cylinders to the pump intake and to the cylinder not receiving fluid under pressure.

2. In a hydraulic machine tool having a reciprocating table, means for reciprocating the table including a closed hydraulic circuit, a first cylinder having a double acting piston reciprocable therein, a single piston rod in said cylinder and connected to the piston, a second cylinder having a single acting piston reciprocable therein, the diameter of the last mentioned piston being equal to the diameter of the piston rod, and reciprocation of the pistons being adapted to cause reciprocation of the table, a pump for supplying fluid under pressure to the cylinders to cause the said pistons to reciprocate therein, valve means in said circuit movable to a first position directing fluid under pressure to the rod end of the double acting piston and to the single acting piston to cause a relatively slow movement of the table in a cutting direction, said valve means being movable to a second position directing fluid under pressure only to the rod end of the double acting piston to cause said table to move at a medium speed in a cutting direction, and said valve means being movable to a third position directing fluid under pressure only to the single acting piston to cause a relatively fast movement of the table in a cutting direction said valve means directing return fluid from said cylinders to the pump intake and to the cylinder not receiving fluid under pressure.

3. In a hydraulic machine tool having a reciprocating member, means for reciprocating the member including a hydraulic circuit, a first cylinder having a double acting piston reciprocable therein, and a second cylinder having a single acting piston reciprocable therein, reciprocation of the pistons being adapted to cause reciprocation of the member, a pump for supplying fluid under pressure to the cylinders to cause the said pistons to reciprocate therein, the said fluid under pressure being supplied to the rod end of the double acting piston on movement of the member in a cutting direction, a first valve means in said circuit movable to a first position directing fluid under pressure to the rod end of the double acting piston and to the single acting piston to cause a relatively slow movement of the table in a cutting direction, said valve means being movable to a second position directing fluid under pressure only to the rod end of the double acting piston to cause said table to move at a medium speed in a cutting direction, and said valve means being movable to a third position directing fluid under pressure only to the single acting piston to cause a relatively fast movement of the table in a cutting direction, and a second valve means in said circuit adapted to apply fluid pressure to both ends of said first cylinder to cause a rapid movement of the member in a return direction in all positions of said first valve.

4. In a hydraulic machine tool having a reciprocating table, means for reciprocating the table including a hydraulic circuit, a first cylinder having a double acting piston reciprocable therein, and a second cylinder having a single acting piston reciprocable therein, reciprocation of the pistons being adapted to cause reciprocation of the table, a reversible pump for supplying fluid under pressure to the cylinders to cause the said pistons to reciprocate therein, the said fluid under pressure being supplied to the rod end of the double acting piston on movement of the table in a cutting direction, a first valve means in said circuit movable to a first position directing fluid under pressure to the rod end of the double acting piston and to the single acting piston to cause a relatively slow movement of the table in a cutting direction, said valve means being movable to a second position directing fluid under pressure only to the rod end of the double acting piston to cause said table to move at a medium speed in a cutting direction, and said valve means being movable to a third position directing fluid under pressure only to the single acting piston to cause a relatively fast movement of the table in a cutting direction, and a second valve means in said circuit being selectively operable upon reversal of direction of flow of said fluid by reversal of the pump, to direct said fluid to both ends of said first cylinder to cause a rapid movement of the table in the return direction in all positions of said first valve, and said second valve means being selectively inoperable whereby said reversal of direction of flow of said fluid is adapted to cause movement of said table in a return direction at the same speed as in the cutting direction as determined by the position of said first valve.

5. In a hydraulic machine tool having a reciprocating member, means for reciprocating the member including a pump, a closed hydraulic circuit, means operating to reverse the direction of flow of said fluid in said circuit, a first cylinder having a double acting piston reciprocable therein and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit to direct fluid under pressure from the pump to the rod end of the first cylinder and to the second cylinder to cause movement of the member in a cutting direction, the fluid discharged from the other end of the first cylinder being returned to the pump intake, and a second valve means in the said circuit adapted upon reversal of the direction of flow of said fluid to apply fluid pressure to both ends of said first cylinder to cause a rapid movement of the member in a return direction, said second valve directing return fluid from said second cylinder to the pump intake.

6. In a hydraulic machine tool having a reciprocating member, means for reciprocating the member including a pump, a closed hydraulic circuit, means operating to reverse the direction of flow of said fluid in said circuit, a first cylinder having a double acting piston reciprocable therein, and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a valve means in said circuit movable to a first position directing fluid under pressure from the pump to the rod end of the first cylinder and to the second cylinder to cause relatively slow movement of the member in a cutting direction, the fluid discharged from the other end of the first cylinder being returned to the pump intake, said valve means being movable to a second position directing fluid under pressure only to the rod end of the double acting piston to cause said member to move at a medium speed in a cutting direction, the fluid discharged from the other end of the first cylinder being directed to the second cylinder and to the pump intake, and said valve means being movable to a third position directing fluid under pressure only to the second cylinder to cause a relatively fast movement of the table in a cutting direction, fluid from the head end of the first cylinder being directed to the rod end of the first cylinder and to the pump intake.

7. In a hydraulic machine tool having a reciprocating member, means for reciprocating the member including a pump, a closed hydraulic circuit, means operating to reverse the direction of flow of said fluid in said circuit, a first cylinder having a double acting piston reciprocable therein, and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit movable to a first position directing fluid under pressure from the pump to the rod end of the first cylinder and to the second cylinder to cause relative slow movement of the member in a cutting direction, the fluid discharged from the other end of the first cylinder being returned to the pump intake, said first valve means being movable to a second position directing fluid under pressure only to the rod end of the double acting piston to cause said member to move at a medium speed in a cutting direction, the fluid discharged from the other end of the first cylinder being directed to the second cylinder and to the pump intake, and said first valve means being movable to a third position directing fluid under pressure only to the second cylinder to cause a relatively fast movement of the table in a cutting direction, fluid from the head end of the first cylinder being directed to the rod end of the first cylinder and to the pump intake, and a second valve means in said circuit adapted upon reversal of the direction of flow of said fluid to apply fluid pressure to both ends of said first cylinder to cause a rapid movement of the member in a return direction, said second valve directing return fluid from the second cylinder to the pump intake.

8. In a hydraulic machine tool having a reciprocating member, means for reciprocating the member including a pump, a closed hydraulic circuit, means operating to reverse the direction of flow of said fluid in said circuit, a first cylinder having a double acting piston reciprocable therein, and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit movable to a first position directing fluid under pressure from the pump to the rod end of the first cylinder and to the second cylinder to cause relatively slow movement of the member in a cutting direction, the fluid discharged from the other end of the first cylinder being returned to the pump intake, said first valve means being movable to a second position directing fluid under pressure only to the rod end of the double acting piston to cause said member to move at a medium speed in a cutting direction, the fluid discharged from the other end of the first cylinder being directed to the second cylinder and to the pump intake, and said first valve means being movable to a third position directing fluid under pressure only to the second cylinder to cause a relatively fast movement of the table in a cutting direction, fluid from the head end of the first cylinder being directed to the rod end of the first cylinder and to the pump intake, and a second valve means in said circuit being selectively operable upon reversal of direction of flow of said fluid to apply fluid pressure to both ends of said first cylinder to cause a rapid movement of the member in a return direction in all positions of said first valve, and said second valve means being selectively inoperable whereby said reversal direction of said flow of said fluid is adapted to cause movement of the member in a return direction at the same speed as in the cutting direction as determined by the position of said first valve.

9. In a hydraulic machine tool having a reciprocating table, means for reciprocating the table including a reversible pump, a closed hydraulic circuit, a first cylinder having a double acting piston reciprocable therein, and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit to direct fluid under pressure from the pump to the rod end of the first cylinder and to the second cylinder to cause movement of the member in a cutting direction, the fluid discharged from the other end of the first cylinder being returned to the pump intake, and a second valve means in the said circuit adapted upon reversal of the direction of flow of said fluid to direct fluid under pressure to both ends of said first cylinder to cause a rapid movement of the member in a return direction, said second valve directing return fluid from said second cylinder to the pump intake, an auxiliary hydraulic circuit, means for circulating hydraulic fluid under pressure in said auxiliary circuit, a pilot valve adapted to be actuated by means on the table to reverse the direction of flow of fluid in said auxiliary circuit, and means in said auxiliary circuit to reverse the said pump on reversal of direction of flow of fluid in the auxiliary circuit.

10. In a hydraulic machine tool having a reciprocating table, means for reciprocating the table including a reversible pump, a closed hydraulic circuit, a first cylinder having a double acting piston reciprocable therein, and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit to direct fluid under pressure from the pump to the rod end of the first cylinder and to the second cylinder to cause movement of the member in a cutting direction, the fluid discharged from the other end of the first cylinder being returned to the pump intake, and a second valve means in the said circuit adapted upon reversal of the direction of flow of said fluid to direct fluid under pressure to both ends of said first cylinder to cause a rapid movement of the member in a return direction, said second valve directing return fluid from said second cylinder to the pump intake, an auxiliary hydraulic circuit, means for circulating hydraulic fluid under pressure in said auxiliary circuit, a first piston and cylinder device interposed in said auxiliary circuit adapted to be reciprocated upon reversal of direction of flow in said circuit, the reciprocation of said piston being adapted to reverse the said pump and a second piston and cylinder device in said auxiliary circuit adapted to be reciprocated upon reversal of direction of flow of said fluid to effect intermittent feed motion of a work carrying member.

11. In a hydraulic machine tool having a reciprocating member, means for reciprocating the member including a pump, a closed main hydraulic circuit, means operating to reverse the direction of flow of said fluid in said circuit, a first cylinder having a double acting piston reciprocable therein and a second cylinder having a single acting piston reciprocable therein, said cylinders being interposed in said circuit and reciprocation of said pistons being adapted to cause reciprocation of the member, a piston rod connected to said double acting piston, said piston rod having the same diameter as the single acting piston, a first valve means in said circuit to direct fluid under pressure from the pump to the rod end of the first cylinder and to the second cylinder to cause movement of the member in a cutting direction, the fluid discharged from the other end of the first cylinder being returned to the pump intake, and a second valve means in the said circuit adapted upon reversal of the direction of flow of said fluid to apply fluid pressure to both ends of said first cylinder to cause a rapid movement of the member in a return direction, said second valve directing return fluid from said second cylinder to the pump intake, a make-up fluid circuit, a supercharge pump in said circuit connectable with said main circuit to supply make-up fluid thereto upon cavitation of hydraulic fluid in the main circuit, and valve means responsive to an excess of fluid pressure in said make-up circuit over the fluid pressure in the main circuit to admit make-up fluid to said main circuit.

RUDOLPH E. HERRSTRUM.
STANLEY A. BJORKLUND.

REFERENCES CITED

The following references are of record in the file of this patent:

UNITED STATES PATENTS

| Number | Name | Date |
|---|---|---|
| 1,812,587 | Ellis | June 30, 1931 |
| 1,840,231 | Harrison et al. | Jan. 5, 1932 |
| 1,843,082 | Ferris et al. | Jan. 26, 1932 |
| 1,866,348 | Ferris | July 5, 1932 |
| 1,909,166 | Burrell | May 16, 1933 |
| 1,999,248 | Melling | Apr. 30, 1935 |
| 2,004,399 | Svenson | June 11, 1935 |
| 2,271,615 | Bauer | Feb. 3, 1942 |